United States Patent
Boriack et al.

(10) Patent No.: US 12,543,644 B2
(45) Date of Patent: Feb. 10, 2026

(54) FEEDER HOUSING WITH TORQUE STOPS FOR AGRICULTURAL VEHICLE

(71) Applicants: CNH Industrial America LLC, New Holland, PA (US); CNH Industrial Belgium N.V., Zedelgem (BE)

(72) Inventors: Cale Boriack, Lititz, PA (US); Lyle Beidler, Akron, PA (US); Nathan Isaac, Lancaster, PA (US); Bjorn Depoortere, Zwevezele (BE); Trevor Book, Lititz, PA (US); Frank Duquesne, Zwevegem (BE)

(73) Assignees: CNH Industrial America LLC, New Holland, PA (US); CNH Industrial Belgium N.V. (BE)

( * ) Notice: Subject to any disclaimer, the term of this patent is extended or adjusted under 35 U.S.C. 154(b) by 490 days.

(21) Appl. No.: 18/097,555

(22) Filed: Jan. 17, 2023

(65) Prior Publication Data
US 2024/0237578 A1   Jul. 18, 2024

(51) Int. Cl.
*A01D 41/06* (2006.01)
*A01D 41/14* (2006.01)

(52) U.S. Cl.
CPC ........... *A01D 41/141* (2013.01); *A01D 41/06* (2013.01)

(58) Field of Classification Search
CPC ............................. A01D 41/141; A01D 41/06
See application file for complete search history.

(56) References Cited

U.S. PATENT DOCUMENTS

| | | | |
|---|---|---|---|
| 5,918,448 A * | 7/1999 | Wheeler | A01D 75/287 56/10.4 |
| 6,510,680 B2 * | 1/2003 | Uhlending | A01D 75/287 56/16.2 |
| 7,360,351 B2 * | 4/2008 | Rickert | A01D 41/144 56/228 |
| 7,805,921 B2 | 10/2010 | Coers et al. | |

(Continued)

FOREIGN PATENT DOCUMENTS

| DE | 4193815 B3 | 10/2020 |
|---|---|---|
| EP | 2764765 A1 | 8/2014 |
| EP | 3025575 A1 | 6/2016 |

OTHER PUBLICATIONS

The Extended European Search Report issued Jun. 14, 2024, by the European Patent Office in corresponding European Patent Application No. 24 152 465.1. (9 pages).

*Primary Examiner* — Claude J Brown
(74) *Attorney, Agent, or Firm* — Buchanan Ingersoll & Rooney PC

(57) ABSTRACT

A feederhouse assembly for an agricultural vehicle includes a feederhouse frame including at least four interconnected walls, an open front end, an open rear end, and a hollow space circumscribed by the four interconnected walls. A header adapter is moveable relative to the feederhouse frame. The header adapter has an adapter sidewall disposed adjacent a feederhouse sidewall of the four interconnected walls. A torque stop is positioned within a gap formed between the feederhouse sidewall and the adapter sidewall. The torque stop has a low-friction bearing surface that is configured for bearing directly on one of the adapter sidewall and the feederhouse sidewall upon deformation of the frame to reduce friction between the adapter sidewall and the feederhouse sidewall.

13 Claims, 4 Drawing Sheets

(56) References Cited

U.S. PATENT DOCUMENTS

| | | |
|---|---|---|
| 8,359,822 B2 | 1/2013 | Honas et al. |
| 9,730,375 B2 | 8/2017 | De Coninck |
| 10,426,089 B2 * | 10/2019 | Matousek ............... A01F 12/46 |
| 10,531,607 B2 | 1/2020 | Schroeder et al. |
| 2019/0327894 A1 | 10/2019 | Matousek et al. |

* cited by examiner

FEEDER HOUSING WITH TORQUE STOPS FOR AGRICULTURAL VEHICLE

FIELD OF THE INVENTION

The present invention relates to agricultural vehicles. More specifically, the present invention relates to a feederhouse assembly for an agricultural vehicle, such as a combine harvester. More specifically, the present invention relates to a feederhouse having a torque stop.

BACKGROUND OF THE INVENTION

As is described in U.S. Pat. No. 9,730,375 to CNH America LLC (the '375 Patent), a header is the part of the agricultural harvester that comprises a harvester device which harvests a crop from the field. The harvester device in the header can, for example, be adapted to cut off grain plants, seed plants or corn, or it can, for example, be adapted to remove corn ears from corn stalks. The harvested crop is then transported by a header conveyor through the header to a header discharge. The header discharge is generally arranged centrally in the rear part of the header. A header auger is a common solution for transporting the crop through the header.

From the header discharge, the harvested crop enters the feederhouse (also referred to in the art as a 'feeder'). The feederhouse transports the harvested crop into the body of the agricultural harvester, where the crop can be processed, e.g. threshed. The feederhouse can be pivotable relative to the body of the agricultural harvester.

The header may be pivotable relative to the feederhouse. Specifically, the header may be pivotable about a generally horizontal axis that extends substantially perpendicular to the longitudinal direction of the header, in order to follow the slope of the terrain. Instead or in addition, the header may also be pivotable about a generally horizontal axis that extends substantially parallel to the longitudinal direction of the header. This allows to obtain a desired cutting angle or pick up angle, even when it is desired to keep the same height for the front end of the feederhouse. The cutting angle or pick up angle may for example have to be adjusted when switching to a different kind of crop, a crop with different properties or when the overall height of the body of the agricultural harvester is changed, e.g. due to the exchange of tires or a change in the tire pressure.

In order to allow movement and/or adjustment of the header and the feederhouse relative to each other, a header adapter is provided between the feederhouse and the header. The header adapter in known agricultural harvesters is actuated by one or more actuators, which usually take the form of hydraulic cylinders. The hydraulic cylinders move the header adapter (and the header mounted thereto) relative to the feederhouse about the axes described above.

The feederhouse may have a hollow rectangular frame that is positioned adjacent to the header adapter. Roll torsion, stresses and bending moments resulting from operation of the hydraulic cylinders and/or general operation of the vehicle over rough terrain could cause deformation of the hollow body of the feederhouse. Deformation of the feederhouse could adversely affect sliding movement of the header adapter relative to the feederhouse upon actuation of the hydraulic cylinders. In other words, when the hydraulic cylinders are actuated, and roll torsion causes deformation of the feederhouse, the header adapter could bind on a surface of the feederhouse, thereby hampering movement of the header adapter due to the increased friction force between the header adapter and the feederhouse.

In view of the foregoing, described herein is a torque stop that either limits or prevents the aforementioned increased friction force such that the hydraulic cylinders can move the header adapter smoothly and without excessive resistance.

SUMMARY OF THE INVENTION

A feederhouse assembly for an agricultural vehicle includes a feederhouse frame including at least four interconnected walls, an open front end, an open rear end, and a hollow space circumscribed by the four interconnected walls. A header adapter is moveable relative to the feederhouse frame. The header adapter has an adapter sidewall disposed adjacent a feederhouse sidewall of the four interconnected walls. A torque stop is positioned within a gap formed between the feederhouse sidewall and the adapter sidewall. The torque stop has a low-friction bearing surface that is configured for bearing directly on one of the adapter sidewall and the feederhouse sidewall upon deformation of the feederhouse frame to reduce friction between the adapter sidewall and the feederhouse sidewall.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
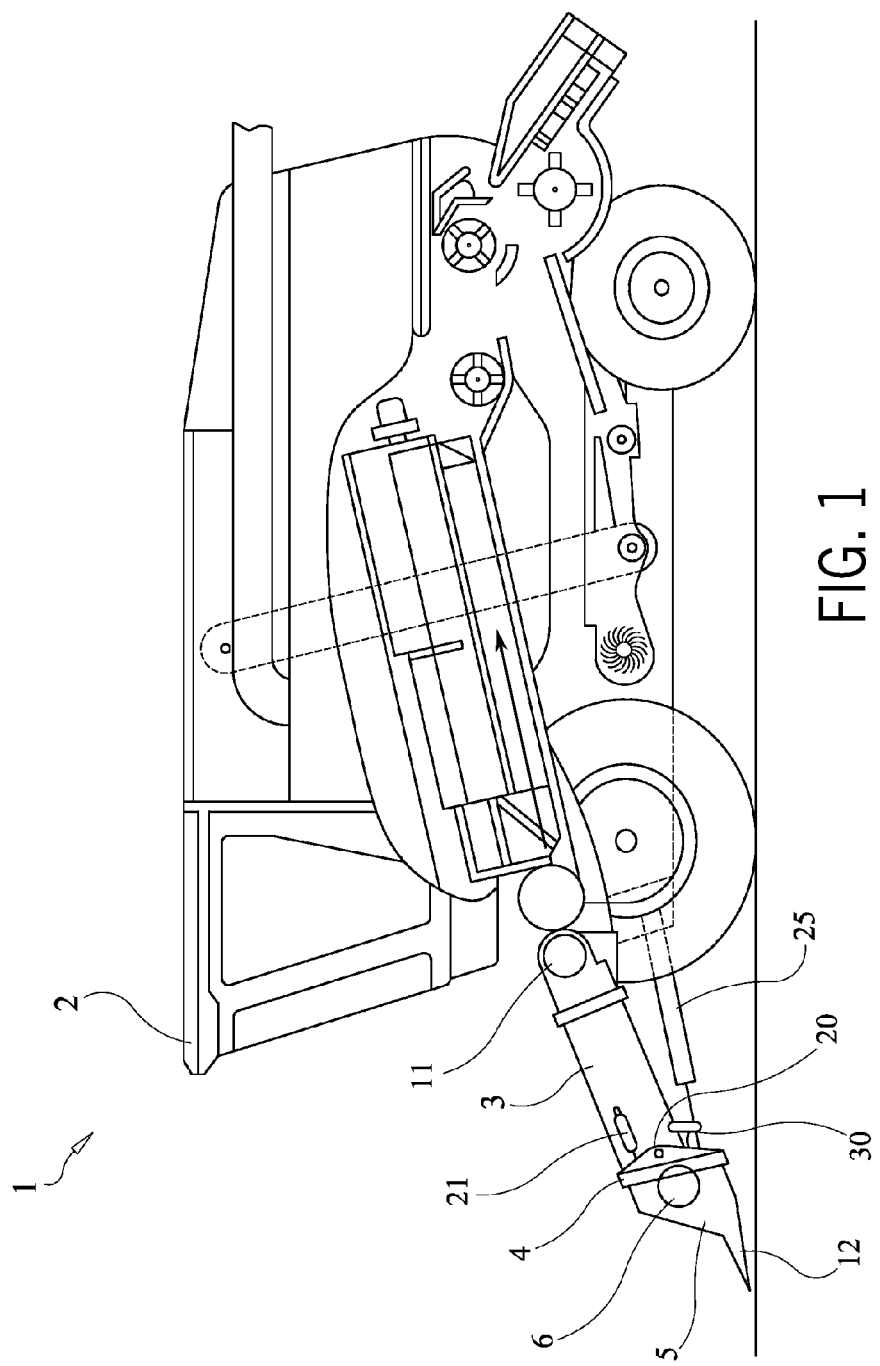
FIG. 1 illustrates an example of an agricultural harvester in accordance with the invention, as seen in side view.

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "forward" (or fore) and "rearward" (or rear or aft) when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The longitudinal direction may be in the direction of travel of the vehicle. The terms "upstream" and "downstream" are determined with reference to the crop flow stream arrows shown in FIG. 1.

Figure 2:
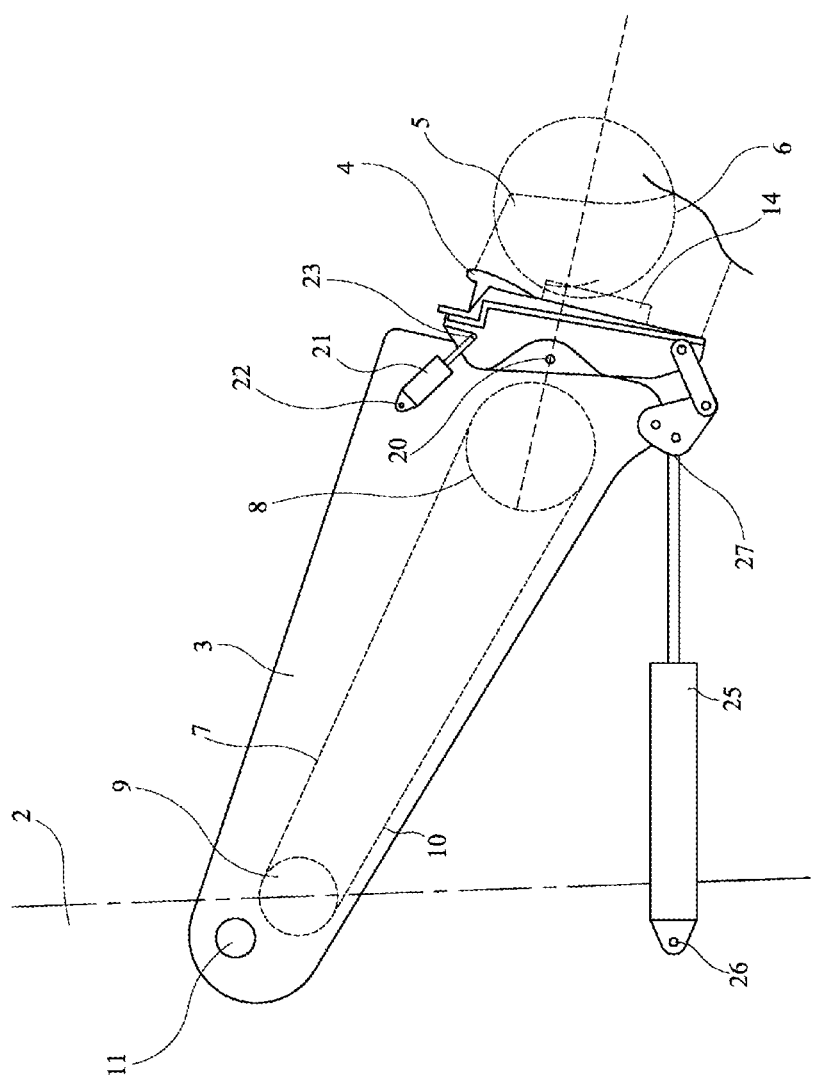
FIG. 2 illustrates the feederhouse, header adapter and first and second actuator of the agricultural harvester of FIG. 1 according to the invention in more detail.

FIG. 1 illustrates an example of an agricultural harvester 1 in accordance with the invention, as seen in side view. FIG. 2 illustrates the feederhouse, header adapter and first and second actuator of the agricultural harvester of FIG. 1 according to aspects of the invention in more detail.

The agricultural harvester of FIG. 1 comprises a harvester body 2, a header 5 and a feederhouse 3. Between the header 5 and the feederhouse 3, a header adapter 4 is arranged.

The header 5 is adapted for harvesting a crop from the field on which said crop was grown. The header 5 can, for example, be equipped a harvester device 12, e.g. a mower or stalk puller. When the crop has been separated from the field, the now harvested crop is transported by a header conveyor 6 from the harvester device to a header discharge 14. The header discharge 14 is where the harvested crop leaves the header. The header conveyor 6 can be, for example, a header auger.

The feederhouse 3 has a hollow and rectangular-shaped frame, housing or body (as viewed in cross-section) that extends longitudinally between an open inlet end and an open outlet end. In other words, the frame of the feederhouse 3 is a four-sided box.

The inlet end of feederhouse 3 is adapted to receive the harvested crop from the header, e.g. from the header discharge 14 to which the header auger 6 has transported the harvested crop. The feederhouse 3 may be pivotable relative to the harvester body 2 about pivot 11. The feederhouse 3 generally contains a feeder conveyor 7 (see FIG. 2) that transports the harvested crop further out of the outlet end of the feederhouse 3 and into the harvester body 2 of the agricultural harvester 1. The conveyor 7, for example, comprises a header side cylindrical drum 8, a body side cylindrical drum 9 and one or more chains or belts 10 wrapped about drums 8 and 9 for carrying crop from the inlet end of the outlet end.

The harvester body 2 of the agricultural harvester optionally contains at least one crop processing device, for example a thresher (shown schematically), a sieving device and/or a cutter device. The harvester body 2 optionally also comprises a grain tank (shown schematically) in which the harvested crop is temporarily stored.

The header adapter 4 is arranged between the header 5 and the feederhouse 3. The header adapter 4 is connected to both the header 5 and to the feederhouse 3. The header adapter 4 is adapted to allow the header 5 to pivot relative to the feederhouse 3. In the example of FIG. 1, the header adapter 4 may be releasably connected to the header 5 and pivotably connected to the feederhouse 3.

An adapter pivot 20 provides the pivotable connection between the header adapter 4 and the feederhouse 3. The adapter pivot 20 is adapted to allow pivoting of the adapter 4 (and header 5 connected thereto) relative to the feederhouse 3 about a horizontal pivot axis which extends substantially parallel to the longitudinal axis of the header 5. Optionally, two adapter pivots 20 are present: one on the left side of the feederhouse 3 and one on the right side of the feederhouse.

Also, additional left-right roll pivots are provided at additional locations on the feederhouse/header/adapter pivot to permit left-right roll of the adapter 4 (and header 5 connected thereto) relative to the feederhouse 3. Actuators in the form of roll cylinders (see, e.g., roll cylinder/actuator 325), control the left-right roll of the header so that the header can better follow the contour of the ground. Such roll pivots and actuators are described in U.S. Pat. No. 10,531,607, which is incorporated by reference in its entirety.

The agricultural harvester 1 further comprises a first actuator 21. The first actuator 21 which has a first end 22 which is pivotably connected to the feederhouse 3 and a second end 23 which is pivotably connected to the header adapter 4. Actuator 21 is configured to move adapter 4 relative to feederhouse 3.

The agricultural harvester 1 further comprises a second actuator 25, which has a first end 26 and a second end 27, which first end 26 is pivotably connected to the harvester body 2. The actuators 21 and 25 may be used to pivot the header 5 relative to the feederhouse 3 by pivoting the header adapter 4 relative to the feederhouse 3. The second actuator 25 may also be used to pivot feederhouse 3 relative to the body 2. Actuator 21 assists actuator 25 (or vice versa) with pivoting.

It should be understood that the arrangement of the actuators 21 and 25 may vary and is not limited to that which is shown.

Figure 3:
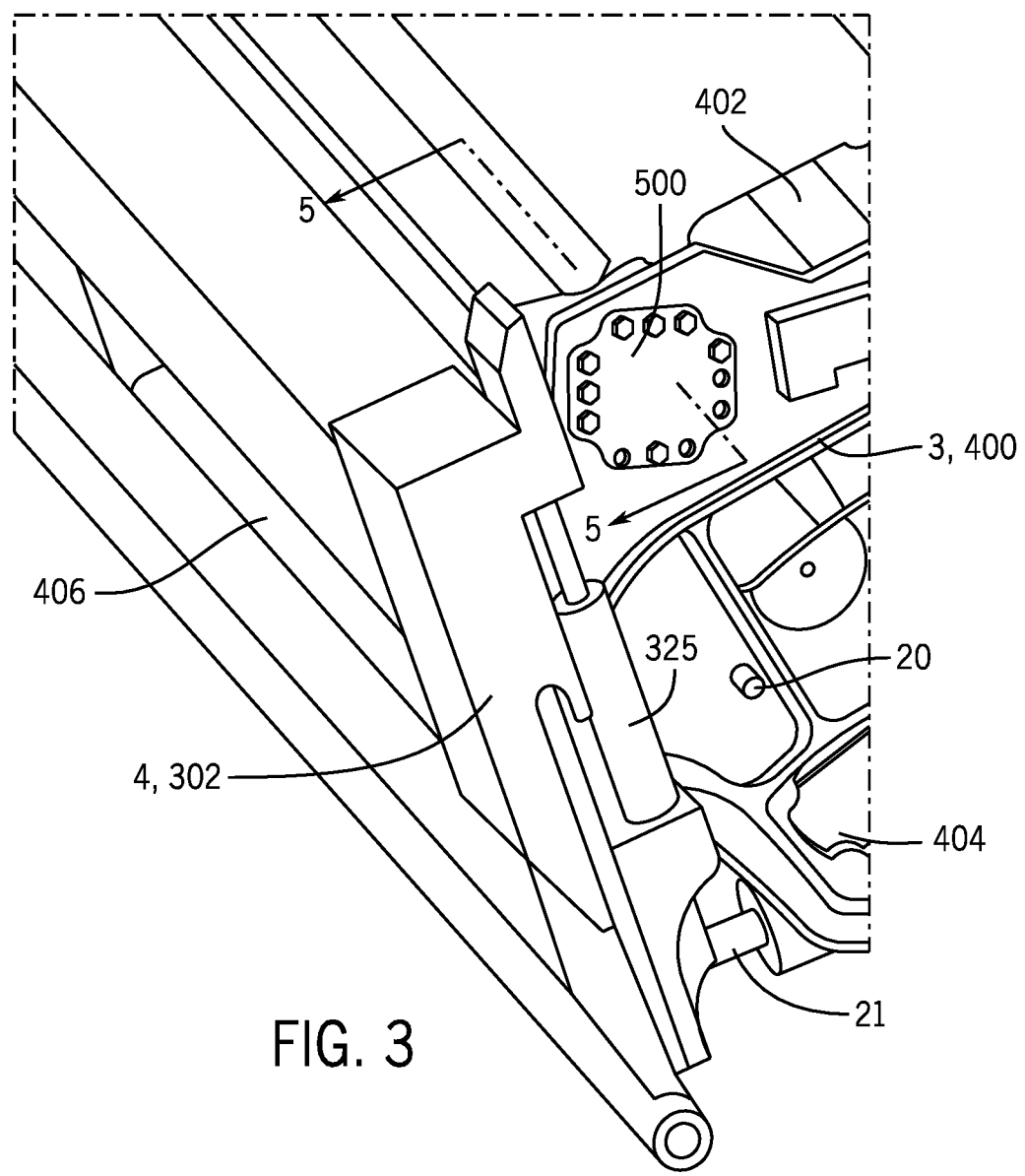
FIG. 3 depicts a partial isometric view of a sub-assembly including the feederhouse and header adapter of FIG. 1.
Figure 4:
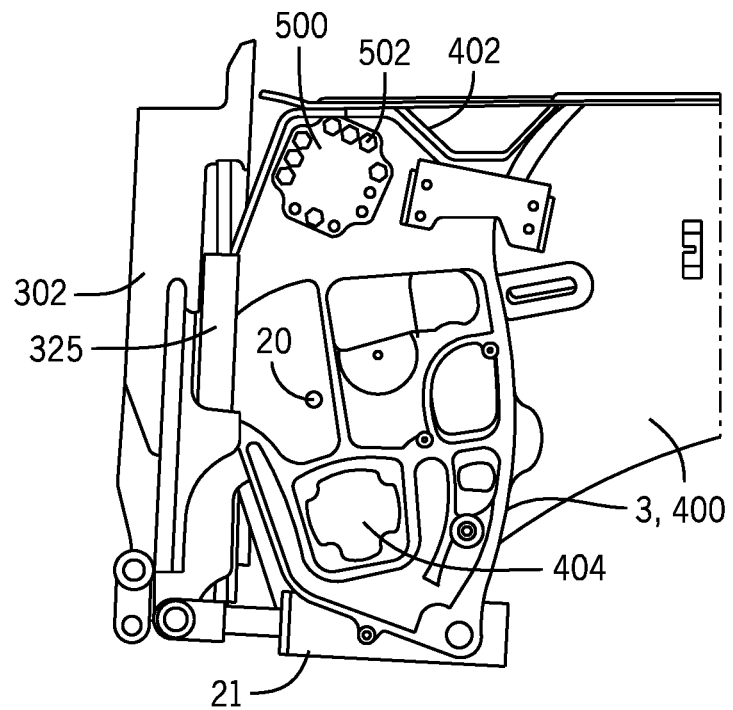
FIG. 4 depicts a side elevation view of the sub-assembly of FIG. 3.
Figure 5:
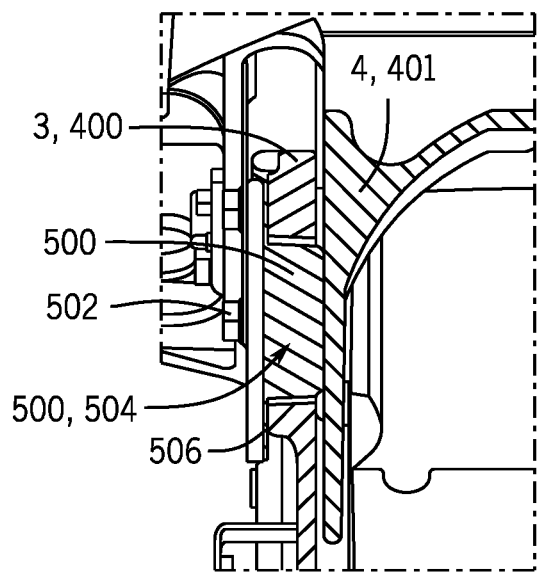
FIG. 5 depicts a cross-sectional view of the sub-assembly of FIG. 3 taken along the lines 5-5.

Turning now to FIGS. 3-5, those figures depict views of a sub-assembly including the feederhouse 3 and adapter 4. It is noted that although feederhouse 3, adapter 4 and actuator 21 may appear differently in FIGS. 3-5, it should be understood that all of the above-described details of those components remain applicable.

The sub-assembly of FIGS. 3-5 includes actuator 21, which controls fore-aft pitch movement of adapter 4 relative to feederhouse 3 (like actuator 21 of FIG. 2). The sub-assembly also includes a left-right roll actuator 325 (also referred to as a roll cylinder) that enables left-right rotation of adapter 4 (and header 5) about a longitudinal axis.

Feederhouse 3 includes a frame 400, in the form of a four-sided box, having (i) an open front side 406 from receiving crop material from header discharge 14, (ii) an open rear side, (iii) a top beam 402 located at or near the top side of frame 400, and (iv) a bottom beam 404 located at or near the bottom side of frame 400. Beams 402 and 404 are configured to enhance the structural integrity of frame 400 and limit deformation of frame 400.

Header adapter 4 includes a header mount arm 302 (one arm per side of adapter 4) to which header 5 can be releasably and directly mounted. As best shown in FIG. 5, a portion of adapter 4 is positioned within the hollow region of frame 400. The portion of adapter 4 positioned within frame 400 may also have a four-sided box shape.

As noted above, if frame 400 of feederhouse 3 (and/or adapter 4) were to deform in operation, then the added friction between frame 400 and adapter 4 (due to the deformation) would hamper movement of the adapter 4 under the power of actuators 21/325. Turning to FIG. 5, the friction may be generated between the deformed side wall of frame 400 and the side wall 401 of adapter 4. It should be understood that in the absence of any deformation of feederhouse frame 400 (and/or adapter 4), adapter 4 can smoothly move relative to frame 400 under the power of actuators 21/325.

As best shown in FIGS. 4 and 5, the harvester 1 includes a torque stop 500 to reduce the friction at the interface between feederhouse frame 400 and adapter 4 caused by, e.g., actuation of actuators 21/325, and resultant deformation of frame 400 (and/or adapter 4). Torque stop 500 is mounted to frame 400 by fasteners 502 in form of bolts or rivets, for example. Torque stop 500 includes a transversely extending and elongated bearing portion 504 that extends through an opening in the wall of frame 400 to a position that is directly adjacent the side wall 401 of adapter 4. A small gap or clearance is ordinarily defined between the bearing surface of torque stop 500 and the side wall 401 of adapter 4, as shown in FIG. 5. That clearance will diminish in the event of deformation of frame 400 (and/or adapter 4).

Torque stop 500 is (optionally) composed of a plastic material that can bear on a dissimilar material (e.g., metal) of adapter 4. Bearing surface 505 may be treated with a low-friction chemical coating, if so desired. The coefficient of friction between the metal and plastic surfaces is less than the coefficient of friction between two metal surfaces. Upon deformation of frame 400 (and/or adapter 4), bearing surface of portion 504 will bear on sidewall 401 of adapter 4. The low coefficient of friction between those components will not inhibit movement of adapter 4 relative to frame 400 of feederhouse 3.

Although not shown, it is envisioned that the torque stop 500 may be mounted to the sidewall 401 (as opposed to the frame 400). Thus, the claimed feederhouse frame could actually represent the adapter.

A series of shims 506 may be sandwiched between a flange of torque stop 500 and adapter 4. Shims 506 may be employed to adjust the clearance between the low-friction bearing surface of portion 504 and side wall 401 of adapter 4 to a desired value.

This application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A feederhouse assembly for an agricultural vehicle, said feederhouse assembly comprising:
   a feederhouse frame including at least four interconnected walls, an open front end, an open rear end, and a hollow space circumscribed by the four interconnected walls;
   a header adapter that includes a surface that is configured to be mounted to a header of the agricultural vehicle, wherein the header adapter is moveable relative to the feederhouse frame about a horizontal pivot axis which extends substantially parallel to a longitudinal axis of the header, the header adapter having an adapter sidewall disposed adjacent a feederhouse sidewall of the four interconnected walls; and
   a torque stop positioned within a gap formed between the feederhouse sidewall and the adapter sidewall, the torque stop having a low-friction bearing surface that is configured for bearing directly on one of the adapter sidewall and the feederhouse sidewall upon deformation of the frame to reduce friction between the adapter sidewall and the feederhouse sidewall when the header adapter moves relative to the feederhouse frame about the horizontal pivot axis.

2. The feederhouse assembly of claim 1, wherein the torque stop is mounted to the feederhouse sidewall and is spaced apart from the adapter sidewall.

3. The feederhouse assembly of claim 2, wherein a gap separating the low-friction bearing surface from the adapter sidewall is less than a gap separating the feederhouse sidewall from the adapter sidewall.

4. The feederhouse assembly of claim 3, further comprising one or more shims positioned between the feederhouse sidewall and the torque stop for adjusting a clearance between the low-friction bearing surface and the adapter sidewall.

5. The feederhouse assembly of claim 1, wherein the torque stop is mounted to the adapter sidewall and is spaced apart from the feederhouse sidewall.

6. The feederhouse assembly of claim 1, wherein the low-friction bearing surface and the adapter sidewall are composed of dissimilar materials.

7. The feederhouse assembly of claim 1, wherein the adapter is at least positioned within the hollow space of the feederhouse.

8. The feederhouse assembly of claim 1, further comprising a hydraulic cylinder for moving the adapter with respect to the feederhouse frame.

9. The feederhouse assembly of claim 1, wherein the low-friction bearing surface is composed of plastic.

10. The feederhouse assembly of claim 1, further comprising a feeder conveyor positioned within the hollow space of the feederhouse for conveying crop material from the open front end to the open rear end.

11. The feederhouse assembly of claim 1, further comprising fasteners for mounting the torque stop to said feederhouse sidewall.

12. An agricultural vehicle comprising the feederhouse assembly of claim 1.

13. A combine harvester comprising the feederhouse assembly of claim 1.

* * * * *